United States Patent [19]
Petersen et al.

[11] Patent Number: 5,980,956
[45] Date of Patent: Nov. 9, 1999

[54] DEOXYGENATION OF AN OIL PRODUCT WITH A LACCASE

[75] Inventors: Bent Riber Petersen; Thomas Erik Mathiasen, both of Copenhagen, Denmark; Bastienne Peelen, Wageningen, Netherlands; Henrik Andersen, Tjele, Denmark

[73] Assignee: Novo Nordisk A/S, Bagsvaerd, Denmark

[21] Appl. No.: 08/913,401

[22] PCT Filed: Apr. 30, 1996

[86] PCT No.: PCT/DK96/00195

§ 371 Date: Sep. 17, 1997

§ 102(e) Date: Sep. 17, 1997

[87] PCT Pub. No.: WO96/35768

PCT Pub. Date: Nov. 14, 1996

[30] Foreign Application Priority Data

May 11, 1995 [DK] Denmark .................................. 544/95

[51] Int. Cl.⁶ ..................................................... A23D 3/00
[52] U.S. Cl. ............................ 426/33; 424/400; 426/601; 514/844
[58] Field of Search .................................. 426/7, 33, 601; 424/400, 401, 61, 78.02; 514/844, 846, 847

[56] References Cited

U.S. PATENT DOCUMENTS 1,994,993  7/1935  Haas et al. .................................. 426/33
2,097,516  11/1937  Coe .......................................... 426/33

FOREIGN PATENT DOCUMENTS 0 338 499  10/1989  European Pat. Off. .
95/21240  8/1995  WIPO .

OTHER PUBLICATIONS

Mistry et al., "Reduction of Dissolved Oxygen in Model Salad Dressing by Glucose Oxidase–Catalase Dependent on pH and Temperature", Journal of Food Science, vol. 57, No. 1, 1992, pp. 196–199.

A. Chiralt et al. "Rheological Characterization of Low–Calorie Milk–Based Salad Dressings", Journal of Food Science, vol. 57, No. 1, 1992, pp. 200–202.

*Primary Examiner*—Leslie Wong
*Attorney, Agent, or Firm*—Steve T. Zelson, Esq.; Reza Green, Esq.

[57] ABSTRACT

A method of deoxygenation of an oil or a product comprising an oil such as a salad dressing, by adding an effective amount of a laccase to the oil or to the product.

14 Claims, 2 Drawing Sheets

DEOXYGENATION OF AN OIL PRODUCT WITH A LACCASE

CROSS-REFERENCE TO RELATED APPLICATIONS

This application is a 35 U.S.C. 371 national application of PCT/DK96/00195 filed Apr. 30, 1996 and claims priority under 35 U.S.C. 119 of Danish application 544/95 filed May 11, 1995.

FIELD OF INVENTION

This invention relates to a simple and effective method of deoxygenation of an oil or a product comprising an oil.

BACKGROUND OF THE INVENTION

Many food items such as salad dressings, e.g., French dressings and mayonnaise are prepared with vegetable oils, e.g., soybean oil. Soybean oil contains a large amount of linoleic and linolenic acids which readily react with the dissolved oxygen in the product whereby undesirable volatile compounds are produced. It has been reported that the flavour quality of oils could be improved by eliminating dissolved oxygen in the oils (for reference see *Journal of Food Science* 57(1), 1992, p. 196).

Antioxidants such as butylated hydroxyanisole, butylated hydroxytoluene, and propyl gallate have been added to foods containing fats to improve their oxidative stability.

Enzymatic deoxygenation with glucose oxidase has been described to reduce the amount of dissolved oxygen in salad dressings significantly (for reference see *Journal of Food Science* 57(1), 1992, p. 199): 0.5% glucose was sufficient to remove 92% of the dissolved oxygen in the salad dressing during 5 days of storage.

Glucose oxidase catalyzes the oxidation of d-glucose to d-gluconic acid in the presence of molecular oxygen: $C_6H_{12}O_6 + 2O_2 + 2H_2O \rightarrow 2C_6H_{12}O_7 + 2H_2O_2$. As it can be seen a by product of this reaction is $H_2O_2$, which can be destructive to the oil product. In order to avoid this problem it has been suggested to add a catalase together with the glucose oxidase; catalase catalyzes the reaction: $2H_2O_2 \rightarrow 2H_2O_2$, but then oxygen is produced again!—however, the overall effect of the enzymatic deaeration by using a combination of glucose oxidase and a catalase is removal of 0.5 mole oxygen for each mole of oxidized d-glucose.

It is an object of the present invention to find a simple and effective enzyme system for oxygen removal in an oil or a product comprising an oil, in which hydrogen peroxide is not involved.

SUMMARY OF THE INVENTION

It has surprisingly been found that laccases are very efficient in reducing the oxygen content in for example salad dressings.

Accordingly, the present invention provides a method of deoxygenation of an oil or a product comprising an oil, the method comprising adding an effective amount of a laccase to said oil or to said product.

BRIEF DESCRIPTION OF DRAWINGS

The present invention is further illustrated by reference to the accompanying drawings, in which.

DETAILED DISCLOSURE OF THE INVENTION

Figure 1:
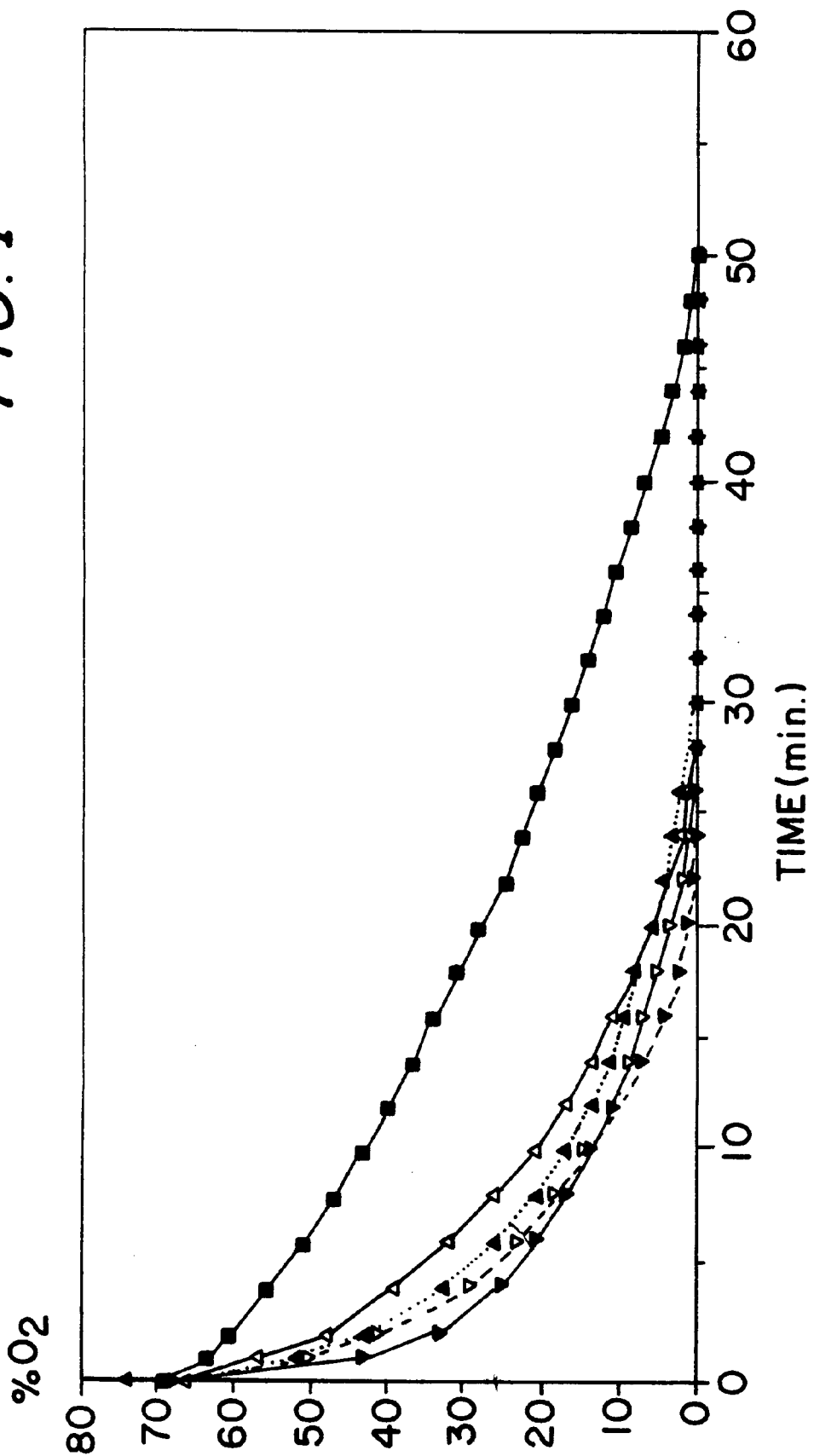
FIG. 1 shows the relation between % oxygen and time in different salad dressings after a laccase is added, the experiments conducted as described in Example 1.

Oils and Products Comprising an Oil.

According to the present invention an oil or a product comprising an oil may be deoxygenated by adding an effective amount of a laccase.

In the context of this invention an oil is defined and characterized as any oil or fat or wax or lipid as disclosed by Frank D. Gunstone et al. in "The Lipid Handbook", 2nd Ed., Chapman & Hall, 1994, pp. 49–223 including aceituno oil, babassu oil, buffalo gourd oil, candlenut oil, canauba oil, castor oil, chinese vegetable tallow and stilingia oil, cocoa butter, coconut oil, corn oil (maize oil), cottonseed oil, crambe oil, Cuphea species oil, Evening primrose oil, fish oil, grapeseed oil, groundnut oil (peanut oil), hemp seed oil, illipe butter, insect waxes, jojoba oil, kapok seed oil, lanolin, linseed oil, milk fat, mowrah butter, mustard seed oil, oiticica oil, olive oil, palm oil, palmkernel oil, poppy seed oil, rapeseed oil, rice bran oil, safflower oil, sal fat, sesame oil, shea nut oil, soybean oil, stillingia oil, sunflower oil, tall oil, tea seed oil, tobacco seed oil, tung oil, ucuhuba oil, vernonia oil, wheat germ oil, and whale oil.

According to the present invention vegetable oils are preferred, in particular soybean oil, palm oil, corn oil, rapeseed oil, olive oil, and cocoa butter.

According to the invention a product comprising an oil may be a food item such as a salad dressing or a personal care product.

In the context of the present invention salad dressings are divided into spoonable (e.g., mayonnaise, cream) and pourable (e.g., French dressings). This definition of salad dressings is also given in "Functional Properties of Food Components", 2nd Ed., Academic Press, Inc, p. 268–269, which is hereby included as reference.

Mayonnaise is a semisolid food typically prepared from edible vegetable oil, egg yolk or eggs (fresh, frozen, or dried), vinegar, and optionally one or more of the following: salt, pepper, sweetener, mustard, paprika, monosodium glutamate, lemon and/or lime juice, stabilisator(s), preservatives, water, and other seasonings. The finished product will normally contain at least 65% vegetable oil. An example of a mayonnaise is listed below:

| | |
|---|---|
| Oil | 75.0–80.0% (w/w) |
| Vinegar (4.5% acetic acid) | 9.4–10.8% (w/w) |
| Egg yolk | 7.0–9.0% (w/w) |
| Sugar | 1.5–2.5% (w/w) |
| Salt | 1.5% (w/w) |
| Mustard | 0.5–1.0% (w/w) |
| White pepper | 0.1–0.2% (w/w). |

Pourable dressings are similar to mayonnaise, except that they contain less oil. They may contain starch pastes as thickeners. Pourable salad dressings can be produced in a variety of ways; a general all-purpose salad dressing may have the following composition (for reference see *INFORM* Vol.3, 1992, p. 1277):

| | |
|---|---|
| Water | 39.5% (w/w) |
| Vineagar | 10.0% (w/w) |

-continued

| | |
|---|---|
| Sucrose | 10.0% (w/w) |
| Starch | 2.0% (w/w) |
| Oil | 30.0% (w/w) |
| Salt | 2.0% (w/w) |
| Gums | 1.0% (w/w) |
| Flavorings | 5.0% (w/w) |
| Preservatives | 0.5% (w/w). |

The method of the invention may also be very useful in a personal care product, in particular in a skin care product such as a cream or a lotion. Oils (fats and waxes) of particular interest in skin care products may, e.g., be lanolin, insect waxes, castor oil, canuba oil and jojoba oil.

Phenolic compounds

According to the present invention, depending on the oil or oil product in question, it may in some cases be an advantage also to add a phenolic compound, in which case the phenolic compound acts as a substrate for the laccase, thereby increasing the deoxygenation of said oil or oil product.

Phenolic compounds which may be used according to the invention, could, e.g., be an anthocyanin or a spice or a flavouring agent, or a combination of more than one phenolic compound, e.g., a spice and a flavouring agent. Examples of such compounds are, e.g., paprika, mustard and lemon juice as described in Example 2.

Of course the phenolic compound used should be one normally allowable as a food ingredient.

The optimal amount of a phenolic compound added to the oil or oil product will depend on a number of factors, of which the most important is that there will be an upper limit at which concentration the oil or oil product becomes uneatable due to too much spice or flavouring agent.

The desirable range for each phenolic compound may be found by running a test series combining various concentrations of the phenolic compound with various concentrations of a laccase and judge the achieved deoxygenation effect and at the same time having a test panel tasting if the oil or oil product is acceptable.

Laccase

Laccase (EC 1.10.3.2) is characterized by being a group of multi-copper proteins of low specificity acting on both o-and p-quinols, whereby oxygen is reduced to water.

According to the invention microbial laccase is preferred. The microbial laccase may be derived from bacteria or fungi (including filamentous fungi and yeasts). The microbial laccase is preferably obtained from a fungus.

Some preferred fungi include strains belonging to the subdivision Basidiomycotina and to the subdivision Ascomycotina. Suitable examples include a laccase obtainable from a strain of Aspergillus, Neurospora, e.g., *N. crassa*, Podospora, Botrytis, Collybia, Fomes, Lentinus, Pleurotus, Pyricularia, e.g., *P. oryzae*, Trametes, e.g., *T. villosa* and *T. versicolor*, Rhizoctonia, e.g., *R. solani*, Coprinus, e.g., *C. plicatilis* and *C. cinereus*, Psatyrella, Myceliophthora, e.g., *M. thermophila*, Schytalidium, e.g., *S.thermophilum*, Polyporus, e.g., *P. pinsitus*, Phlebia, e.g., *P. radita* (WO 92/01046), Coriolus, e.g., *C. hirsutus* (JP 2-238885), Hygrophoropsis, Agaricus, Vascellum, Crucibulum, Myrothecium, or Sporormiella.

In particular laccases obtainable from *T. villosa*, *T.versicolor*, *M. thermophila* or *P. oryzae* are preferred.

The laccase may furthermore be one which is producible by a method comprising cultivating a host cell transformed with a recombinant DNA vector which carries a DNA sequence encoding said laccase as well as DNA sequences encoding functions permitting the expression of the DNA sequence encoding the laccase in a culture medium under conditions permitting the expression of the laccase and recovering the laccase from the culture.

Determination of Laccase Activity (LACU)

Laccase activity is determined from the oxidation of 2,2'-azinobis(3-ethylbenzothiazoline-6-sulfonate) (ABTS) by oxygen. The greenish-blue colour produced is photometered at 418 nm. The analytical conditions are 1.67 mM ABTS, 0.1 M phosphate buffer, pH 7.0, 30° C., 3 minutes reaction.

1 laccase unit (LACU) is the amount of enzyme that catalyses the conversion of 1 μmole ABTS per minute at these conditions.

Addition of Laccase

According to this invention the oil or the product comprising an oil may be produced in the manner known per se.

According to the invention addition of laccase may take place at any step during the manufacture of said oil or said oil product, often the addition will take place as the last or one of the last processing steps, but laccase may also be added as a prophylactic treatment at an earlier stage in order to remove any oxygen that may come into the oil or oil product during processing.

The amount of laccase added will typically be in the range of from 0.001–1000 LACU per g oil, preferably in the range of from 0.01–500 LACU per g oil, more preferably in the range of from 0.1–100 LACU per g oil, most preferably in the range of from 1–50 LACU per g oil.

The invention is further illustrated in the following examples which are not intended to be in any way limiting to the scope of the invention as claimed.

EXAMPLE 1

Deoxygenation of Salad Dressings at Different pH values using Laccase

To show the oxygen consumption in salad dressings by use of laccase at different pH values the following dressing was used:

| | |
|---|---|
| vegetable oil (Rapeseed oil) | 334 g |
| vinegar | 110 g |
| granulated sugar | 25.08 g |
| iodized salt | 2.84 g |
| xanthan gum | 1.70 g |
| paprika powder | 1.06 g |
| dry mustard | 1.12 g |
| lemon juice | 66 g; | the total oil content in this salad dressing is 62.8% (w/w). This salad dressing was then diluted with water to a total oil content of 12.6% (w/w).

A laccase (a *Trametes villosa* laccase available from Novo Nordisk A/S under the trade name SP 504) at a dosage of 33.5 or 67 LACU per g oil was then added to the salad dressing at pH 3, at pH 4 and at pH 5 (at pH 3 only the dosage of 67 LACU per g oil was tested); temperature was ambient (25° C.), and the percentage of oxygen was measured (% related to water saturated with oxygen) by means of a Rank Oxygen Electrode over the next 50 minutes.

The results are presented in FIG. 1. The following symbols were used:

■ (pH 3; 67 LACU per g oil)

▽ (pH 4; 67 LACU per g oil)

Δ (pH 4; 33.5 LACU per g oil)
▼ (pH 5; 67 LACU per g oil)
▲ (pH 5; 33.5 LACU per g oil).

As shown in FIG. 1 laccase is clearly able to deoxygenate the salad dressing and thereby the oil; the oxygen concentration is zero after 30 minutes at pH 4 and at pH 5, and at pH 3 it is zero after 50 minutes.

EXAMPLE 2

Effect of Flavouring Agents in Salad Dressings on the Rate of Deoxygenation

The effect of flavouring agents such as lemon juice, paprika and mustard in salad dressings on the rate of deoxygenation with laccase was shown by adding only one flavouring agent to a basic salad dressing and then measuring the deoxygenation rate of that particular agent. The following basic dressing was used:

| | |
|---|---|
| vegetable oil (Rapeseed oil) | 334 g |
| vinegar | 110 g |
| granulated sugar | 25.08 g |
| iodized salt | 2.84 g |
| xanthan gum | 1.70 g. |

To this basic dressing one of the following flavouring agents was added:

1) 12.8% lemon juice
2) 0.4% paprika powder and 12.4% water
3) 0.4% dry mustard and 12.4% water.

The resulting dressing was diluted with water to a total oil content of 12%(w/w) and pH was adjusted to 4.

A laccase (a *Trametes villosa* laccase available from Novo Nordisk A/S under the trade name SP 504) at a dosage of 60 LACU per g oil was then added to the different salad dressings; temperature was ambient (25° C.), and the percentage of oxygen was measured (% related to water saturated with oxygen) by means of a Rank Oxygen Electrode over the next 60 minutes.

Figure 2:
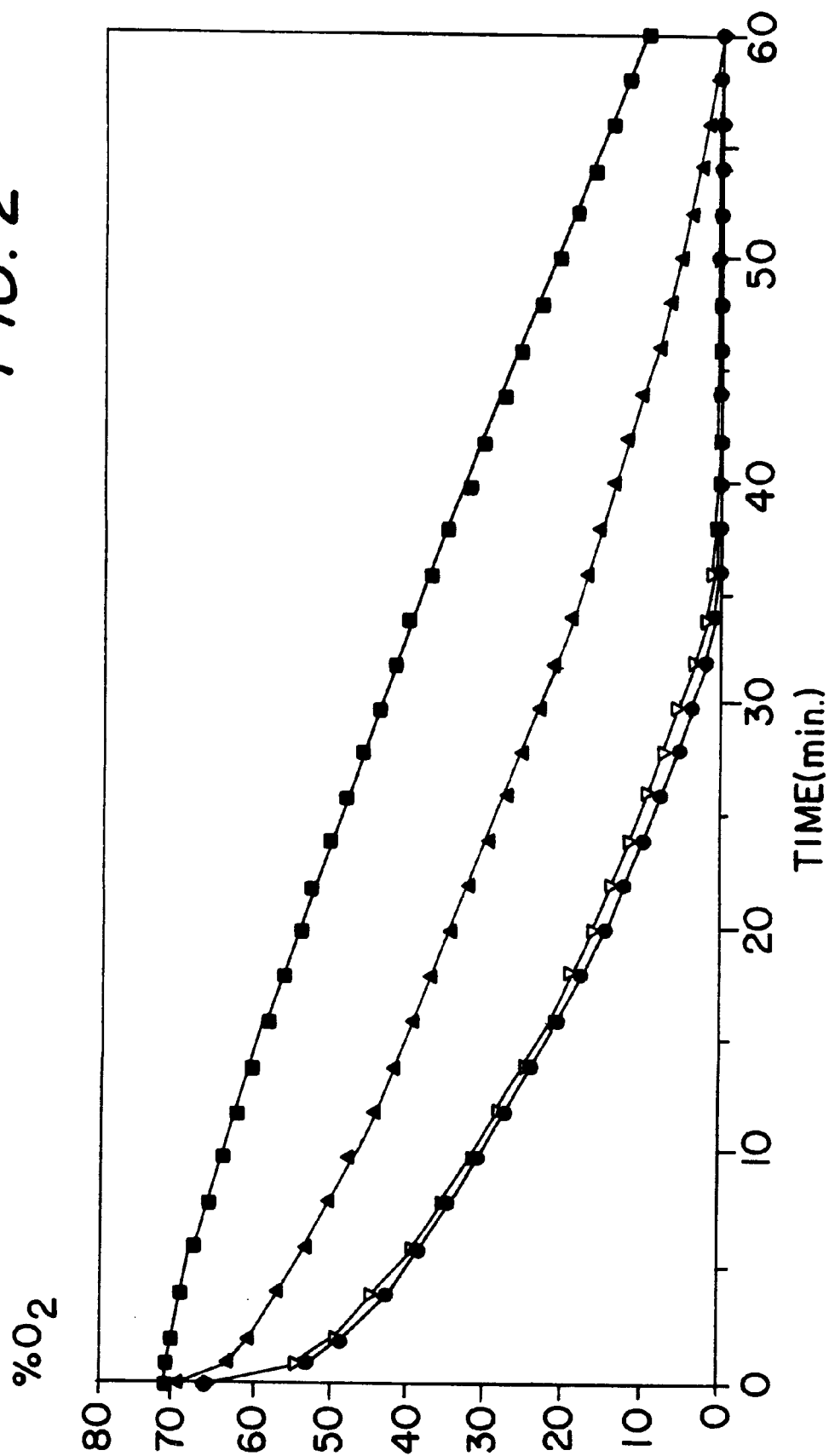
FIG. 2 shows the relation between % oxygen and time in salad dressings after a laccase is added, the experiments conducted as described in Example 2.

The results are presented in FIG. 2. The following symbols were used:

■ salad dressing without flavouring agents (control);
▽ + mustard;
▲ + paprika;
●+ lemon juice.

As shown in FIG. 2 the flavouring agents have a very positive influence on the deoxygenation rate; the oxygen concentration is zero after 35–40 minutes when mustard or lemon juice is added; the oxygen concentration is zero after 60 minutes when paprika is added, whereas the control with no added flavouring agent still contains about 10% oxygen after a reaction time of 60 minutes.

We claim:

1. A method of deoxygenation of an oil or a product comprising an oil, said method comprising adding an effective amount of a laccase to said oil or to said product.

2. A method according to claim 1, wherein the oil is a vegetable oil.

3. A method according to claim 2, wherein the oil is selected from the group consisting of soybean oil, palm oil, corn oil, rapeseed oil, olive oil, and cocoa butter.

4. A method according to claim 1, wherein the product comprising an oil is a food item.

5. A method according to claim 4, wherein the food item is a salad dressing.

6. A method according to claim 5, wherein the salad dressing is a mayonnaise.

7. A method according to claim 1, wherein the product comprising an oil is a personal care product.

8. A method according to claim 1, wherein the laccase is a microbial laccase.

9. A method according to claim 8, wherein the microbial laccase is derived from a fungus.

10. A method according to claim 9, wherein the microbial laccase is derived from a strain of Aspergillus, Neurospora, Podospora, Botrytis, Collybia, Fomes, Lentinus, Pleurotus, Trametes, Rhizoctonia, Coprinus, Psatyrella, Myceliophthora, Schytalidium, Polyporus, Phlebia, Pyricularia, Coriolus, Hygrophoropsis, Agaricus, Vascellum, Crucibulum, Myrothecium, or Sporormiella.

11. A method according to claim 10, wherein the microbial laccase is derived from *T.villosa, T.versicolor, M. thermophila* or *A. oryzae*.

12. A method according to claim 1, wherein the amount of laccase is in the range of from 0.01–100 LACU per g oil.

13. A method according to claim 1, additionally adding at least one compound which acts as a substrate for the laccase.

14. A method according to claim 13, wherein the compound is mustard, paprika or lemon juice.

* * * * *